Patented Mar. 2, 1954

2,671,073

UNITED STATES PATENT OFFICE 2,671,073

MODIFIED BUTYL RUBBER

Lester Marshall Welch, Madison, Joseph F. Nelson, Rahway, and Howard L. Wilson, Iselin, N. J., assignors to Standard Oil Development Company, a corporation of Delaware No Drawing. Application September 30, 1950,
Serial No. 187,828

12 Claims. (Cl. 260—80.7)

This invention relates to improved and useful rubbery polymeric materials and relates particularly to interpolymeric materials and means for improving their cold flow characteristics. The invention relates especially to interpolymeric materials containing minor amounts of a coupling agent selected from non-conjugated diolefins having terminal isopropenyl groups,

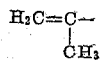

the groups being separated by at least one carbon atom.

It has heretofore been found possible to prepare valuable copolymers by polymerizing mixtures of an isoolefin such as, specifically, isobutylene, with conjugated diolefins, for example, butadiene, isoprene, pentadiene, and dimethyl butadiene. It is preferred to employ for these copolymers a major proportion of the monoolefin and a minor proportion of the conjugated diolefin. The presence of the diolefin permits the preparation of a copolymer in which the chemical unsaturation is high enough to enable vulcanization, and is higher than in the case with polymers prepared from isoolefins alone, the advantage including ease of vulcanization. The present invention provides a new type of soluble interpolymer, the interpolymerization being carried out between an isoolefin, a conjugated diolefin, and a non-conjugated diolefin such as dimethallyl and its homologues. This interpolymer is produced by a low temperature polymerization technique using a diluent-refrigerant and a dissolved Friedel-Crafts type catalyst as, for example, aluminum chloride dissolved in an alkyl halide. The resulting interpolymers are elastic, plastic substances having physical characteristics closely similar to but improved over the simple interpolymers of isobutylene and conjugated diolefins. Additionally, the polymers of the present invention are substantially soluble in organic solvents, including either aliphatic, aromatic, or chlorinated solvents.

The rubbery interpolymers of iso-monoolefins, such as isobutylene, and conjugated diolefins such as isoprene and butadiene, are marketed commercially under the trade-mark known as Butyl rubber, and also under the Government designation: GR–I. This synthetic rubber has a sufficient number of physical properties of natural rubber such that it is excellent for certain uses. Polymers of the Butyl type have been found to be particularly suitable for automobile inner tubes because of resistance of the material to the diffusion of air and other gases when under pressure. In the manufacture of inner tubes and other types of rubber materials, difficulties have been encountered in the processing steps. Although the Butyl polymers extrude and show moderate swell at the extruder die, after extrusion, the physical properties of the Butyl rubber, namely, the "cold flow" of the material causes the extruded object to lose shape if it is allowed to stand for several hours at room temperature before a final curing. Consequently, the forming steps must necessarily be carried out rapidly without a pause until the material is cured. This requirement is of disadvantage in plant practice and causes a considerable number of rejects of extruded objects due to mechanical failure of the compound.

It has been now found that if the polymerization of the iso-monoolefin and the conjugated diolefin is carried out in the presence of very small amounts, up to a maximum limit of 0.8%, of dimethallyl or its homologues or non-conjugated aliphatic diolefins having terminal isopropenyl groups, it is possible to maintain a reasonable extrusion rate but at the same time reduce the tendency of the cold flow of the polymer. Thus, when this improved synthetic rubber is employed for the manufacture of formed articles, the cold flow is either completely removed or very greatly reduced.

These interpolymers of the present invention which contain non-conjugated diolefins having terminal isopropenyl groups, as, for example, dimethallyl, can be combined with sulfur monochloride or with elemental sulfur under the influence of a sulfurization aid, such as tetramethyl thiuram disulfide in a similar manner to that employed for the well-known interpolymers of isobutylene and the conjugated diolefins. Thus, these new compositions are readily vulcanizable by well-known commercial methods.

The process of the present invention thus comprises a preparation of a mixture of the preferred iso-monoolefin, isobutylene, in major proportions, and a diolefin containing at least two conjugated ethylenic linkages and having from 4 to 8 carbon atoms per molecule in minor proportions, such substances including butadiene, isoprene, piperylene, and dimethyl butadiene, and adding to the mixture from 0.1% to no more than 0.8% of dimethallyl or an equivalent non-conjugated diolefin. The resulting mixture of olefins and diolefins is polymerized at a temperature below 0° C. within the range from 0° C. to −164° C. This polymerization is carried out by the application to the cold olefin mixture of a Friedel-Crafts catalyst in solution to produce the desired soluble copolymer. The copolymer is removed from the polymerization reactor, allowed to reach room temperature, and washed with water to hydrolyze and remove residual catalyst and to drive out dissolved and adsorbed monomers present from the original reaction mixture. The polymer can then be compounded with appropriate amounts of zinc oxide, carbon black, stearic acid, if desired, and a curing agent or agents which may be sulfur and a sulfurization aid, or may be paraquinone dioxime, or may be dinitrosobenzene, or their analogues, homologues, and/or equivalents. The resulting compounded polymer is then extruded into the desired shape, for instance, a tubular shape, is carried through the subsequent forming, splicing and valve pad applying operations, and is then cured under pressure in an appropriate mold in order to yield the desired finished article, particularly, an inner tube. Storage of the uncured tubes as is required in normal tube factory operations does not result in excess bruising or in the development of thin spots or other defects where applicants' improved polymer containing minute amounts of from 0.1 to 0.8% of dimethallyl is used in the polymerization.

In actually practicing the invention, the first raw material is the preferred iso-monoolefin, isobutylene, which is preferably of a purity of at least 96 to 99.5%. The second raw material is a multiolefin containing at least two carbon-to-carbon double linkages. The preferred substance for Butyl type rubber is the diolefin, isoprene, but other multiolefins having from 4 to 8, inclusive, carbon atoms are useful. The isobutylene and the multiolefin, preferably a diolefin, are mixed together in a proportion which depends somewhat upon the characteristics of the multiolefin. For instance, with butadiene, the reaction mixture which is to be polymerized may contain from 70 to 90 parts of isobutylene with from 30 to 10 parts of butadiene. With isoprene, the preferred range is from 95 parts to 99.5 parts of isobutylene with from 5 parts to 0.5 part of isoprene. It is to be noted that most of the multiolefins do not copolymerize into the finished copolymer in the proportion in which they are present in the initial reaction mixture. For instance, with butadiene and isobutylene together, approximately 20% of butadiene present causes the copolymerization of only about 1% of the butadiene into the copolymer, and accordingly, there is a change in relative concentration of butadiene and isobutylene as the batch reaction proceeds. Most of the other unsaturates show different polymerization ratios, isoprene, however, enters the polymer in about the ratio as it is found in the polymerizing mixture.

For the non-conjugated diolefin, a preferred substance is dimethallyl

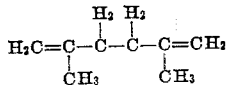

This substance contains two carbon atoms interposed between the isopropenyl terminal groups. The corresponding substance called 2,4-dimethyl-1,4-pentadiene, and containing a single interposed carbon atom is also useful, as well as the several higher homologues containing from 3 to 6 carbon atoms interposed between the isopropenyl radicals. In using these substances, it is of great importance to use percentages of from 0.1% to 0.8% based on the isobutylene used. The use of larger amounts of the dimethallyl and its related compounds causes the production of an insoluble polymer which it is desirable to avoid in the practice of this invention as it possesses certain undesirable processing qualities.

The isobutylene is conveniently obtained as a by-product from petroleum cracking operations. The dimethallyl is readily produced by condensation of methallyl chloride in the presence of a suitable metal, such as magnesium, suspended in diethyl ether.

The polymerization reaction may be conducted batchwise, or in a continuous operation, in which continuous streams of cold catalyst and cold unsaturate with a diluent, if used, are delivered to the reactor and an overflow of a slurry or solution of polymer is taken out for the recovery of the polymer.

By the use of the continuous polymerization process, the concentrations of monomers can be maintained at any desired value by proper control of feed rates and conversion level to produce a more homogeneous polymer.

The polymerization reaction is conducted within a range between 0° C. and −164° C., preferably within the range between −40° C. or −50° C. and −110° C. The reduced temperature may be obtained by the direct admixture of a refrigerant-diluent such as liquid propane yielding about −40° C.; or solid carbon dioxide yielding about −78° C. or liquid ethane yielding about −88° C., or liquid ethylene yielding about −103° C. For an "internal refrigerant" it is essential that the refrigerant be free from any tendency to copolymerize, and free from any tendency to react with the catalyst. These requirements exclude such compounds as propylene, ammonia, and the like.

Alternatively, the reduced temperature may be obtained by a refrigerating jacket upon the reaction vessel. Any convenient refrigerant may be used in the reactor jacket, including carbon dioxide, propane, especially under vacuum, ethane and ethylene, also under vacuum, or if desired, liquid methane, liquid nitrogen or liquid air, although, as a rule, these latter refrigerants yield lower temperatures than are necessary. In some instances, the fluoro chloro organic compounds, known collectively as "Freon," are also usable, depending upon the temperature desired, and the particular compound available. These fluoro chloro organic compounds are, in some instances, also usable as internal refrigerants. Ethyl and methyl chloride under high vacuum also are sometimes usable, although generally, the obtainable temperatures with these compounds are not sufficiently high.

The reaction may be conducted upon the mixed unsaturates as such or it may be conducted in the presence of from ½ to 10 volumes of a diluent which may be, as above pointed out, a refrigerant diluent, or may be a simple diluent, such as ethyl or methyl chloride, or methylene or ethylene dichloride or chloroform, or ethylene trichloride, or a hydrocarbon such as propane, butane or the like. In a continuous polymerization the diluent may consist of about 5 to 20 volumes per volume of reactants under equilibrium conditions in the reactor. The only requirements upon the diluent are that it shall be liquid at the reaction temperature, that it shall be non-reactive with the catalyst, and that it shall be sufficiently stable under the reaction conditions to avoid the production of breakdown products harmful to the reaction. Various of the Freons also are useful as diluents, as is carbon disulfide, carbon dioxide which is quite highly soluble in the reaction mixture even at low temperatures, and the like.

The catalyst is a Friedel-Crafts active metal halide catalyst substance in solution in a low-freezing, non-complex-forming solvent. Aluminum chloride is usually the preferred catalytic substance with aluminum bromide and titanium tetrachloride just about as satisfactory. Boron trifluoride in solution is satisfactorily usable with some of the diolefins. For the catalyst solvent, it is only necessary that the solvent shall have a freezing point below 0° C., although it is usually convenient to use a catalyst solvent having a freezing point below the polymerization temperature. These requirements are met by any solvent which is low-freezing, thereby having a freezing point below the freezing point of water. It is also essential that the solvent be non-complex-forming, meaning thereby that there does not separate from the solution, on evaporation of the solvent, a compound between the solvent and the Friedel-Crafts catalyst, and that upon the addition of solvent in the form of a vapor or liquid to the catalyst at constant temperature, there shall be a substantially continuous change in the composition of the catalyst phase and a continuous increase in the partial pressure of the solvent. In general, the catalyst can be recovered unchanged by removal of the solvent. The preferred catalyst solvents with aluminum chloride are ethyl and methyl chloride or methylene or ethylene dichloride or chloroform, or occasionally, propyl chloride or carbon disulfide, or the like. With aluminum bromide or boron trifluoride, the same solvents are advantageously usable, and, in addition, the lower-freezing hydrocarbons such as liquid propane, liquid ethane, liquid butane, liquid heptane, liquid hexane, and the like, are also usable. This polymerization procedure is shown in full detail in United States Patent No. 2,356,128 issued to Thomas and Sparks on August 22, 1944, to which cross reference is herewith made, and the contents of which patent are herewith incorporated into and made a part of the present application.

The soluble modified copolymer products so produced show reduced cold flow, increased plasticizer tolerance, and much improved cure characteristics. The modifications also appear to result generally in improved vulcanizate properties over a relatively wide range of temperatures. The use of dimethallyl as a cross-linking and modifying agent is particularly desirable as it is more readily prepared and maintained in a high state of chemical purity than other agents of similar nature such as divinylbenzene. The latter compound, as usually prepared by alkylation and dehydrogenation reactions, invariably is a mixture of isomers and impurities, in fact, generally containing 50% or more of extraneous impurities. Divinylbenzene itself has certain effects, but the effects of the various isomers and impurities are unknown and unpredictable. This control of the exact effects from any predetermined amount of the modifier is difficult because of the impurities present in the relatively small amount of modifier to be added.

It is to be especially noted as outstanding and surprising that amounts of dimethallyl up to about 0.8% in a copolymer of isobutylene and isoprene give a soluble polymer since the usual type of cross-linking agents, including divinyl benzene and amounts of dimethallyl above this 0.8% concentration give insoluble polymers which show undesirable processing properties.

The production of soluble or insoluble polymers by bi-functional agents, such as dimethallyl, may be considerably influenced by a number of other factors. One important factor is the average chain length of the polymer produced without the diolefin being present. If this average chain length is decreased by the aid of a "poison," such as n-monoolefins, ethers, alcohols, etc., then somewhat greater quantities of the diolefin may be used in the feed without the formation of the undesirable, insoluble polymer.

In the data presented below, butene-1 was used as a molecular weight modifier to keep the Mooney viscosity of the polymers in a desirable processing range (35–50). The use of such a modifier permitted the inclusion of up to about 2% of dimethallyl (based on the isobutylene) without producing a totally insoluble polymer. Without the use of the modifier, only up to about 0.8% of the dimethallyl could be used as modifier. The polymer prepared with 4% dimethallyl was totally insoluble.

A further advantage for the use of dimethallyl is shown in that, at amounts up to 0.8%, it does not produce appreciable gelation while about 0.8% to 1% of divinylbenzene does produce a gel. Also, the cured rubber products modified by dimethallyl show a relatively higher value for modulus at constant unsaturation values showing a relatively higher state of cure.

In measuring the cold flow properties of a plastic polymer, a portion of the raw polymer free from any compounding agents, sufficient in amount to make a cylindrical pellet ¾" in diameter and ½" in height is placed in a cylindrical mould and held for 40 minutes at a temperature of 287° F. under sufficient pressure to produce a homogeneous, well-shaped pellet. The pellet is then removed from the mould, measured for heights, and placed on a flat plate in an air oven held at 40° C. A weight of 1.8 kilograms is then placed on the pellet and allowed to remain for three minutes. At the end of the three minutes, the weight is removed and the pellet is placed in boiling water for 15 minutes to allow complete recovery of the elastic component of the deformation. The pellet is then accurately measured for its final height. The "cold flow" or "permanent deformation" is then calculated from the following equation:

Cold flow (percent/sec.) =

$$\frac{\text{original height minus final height}}{\text{original height} \times \text{time (secs.)}} \times 100$$

It will be noted that this procedure measures the change in height due to flow at 40° C. and avoids any question of elastic deformation which may not be rapidly recovered. It is found that this measurement method is an excellent means for determining the resistance of the polymer to plastic flow and to change of shape during standing at room temperature in plant processing.

In the data shown below, the polymers modified with dimethallyl show lower cold flow than the corresponding Mooney control polymer. In fact, the polymers modified with up to about 1% dimethallyl have sufficiently low cold flow as to prevent the molding of completely relaxed slugs. Also, the modified dimethallyl polymers have higher recovery values (are more elastic) than the control polymer.

In measuring the extrusion rate, a small or laboratory type extruder consisting of a power-driven worm operating within a corrugated casing with a die at the outlet end is used, and the rate in inches per minute at which the polymer can be forced through the die without the production of irregular or erratic product is measured. The extruder usually has a steam-jacketed barrel and the extrusion may be conducted at temperatures ranging from 200° F. to 230° F., the preferred temperature being 237° F. The number of inches of tube which can be extruded in one minute is then measured and this measurement is an excellent indication of the rate at which the polymer can be extruded in plant practice. The extrusion properties were good up to about 0.8% of the dimethallyl polymer.

The amount of "swell" is determined by measurement of the gram weight per inch of a tube extruded through a standard die. The standard die has a 0.4" diameter opening and a 0.3" diameter core so as to give an extruded tube of 0.4" outside diameter and a 0.3" inside diameter and a value of 1.03 grams per inch if no "swell" occurred. The weight of 1 inch of the tube extruded from this die is the "swell." Both the extrusion rate decreases and the amount of swell increases, although the polymers are quite acceptable until the dimethallyl is increased to about 0.8%. At about 1% dimethallyl concentrations, the extrusion rate is undesirably low (45 inches per minute).

In the examples shown below, all parts and percentages are by weight unless otherwise indicated.

EXAMPLE 1

A series of batch polymerizations were conducted in which the first batch as a control contained 97 parts of isobutylene of approximately 98.5% purity with 3 parts of isoprene of approximately 96% purity. This batch was cooled by a liquid ethylene cooling jacket to approximately $-103°$ C. (the temperature tends to range between $-95°$ C. and $-102°$ C.) and there was added to the mixture approximately 3 volumes of methyl chloride. When the mixture had been fully cooled to the desired temperature, it was polymerized by the addition of approximately 150 parts of a 0.23 solution of aluminum chloride in methyl chloride; this amount being sufficient to cause the polymerization of approximately 50–72% of the unsaturates present, as shown in the following Table 1 in runs 1 and 2. Simultaneously, ten additional batches were prepared, containing from 0.2 to 10% of dimethallyl based on the isobutylene used. In each run, varying amounts of butene-1 were employed as a "poison" as explained above. These runs were similarly polymerized by similar amounts of catalyst solution, as shown in Table 1. After the polymerization step, the polymerized mixture was discharged into warm water to volatilize out the methyl chloride and the unpolymerized unsaturates and the polymer was then brought up to room temperature, dried, compounded, and then extruded in the standard extruder to determine the permissible extrusion rate and swell. Simultaneously, measurements of cold flow were made as above outlined. At the same time, other portions of the polymer were compounded according to the following recipe:

| | Parts |
|---|---|
| Polymer | 100 |
| Zinc oxide | 5 |
| Sulfur | 2 |
| Carbon black (Channel black) | 50 |
| TUADS (tetramethyl thiuramdisulfide) | 1 |
| Captax (2-mercaptobenzothiozole) | 0.5 |

Portions of the three batches of polymers so compounded were cured in the press for 20 and 40 minutes and determinations were then made in tensile strength, elongation at break and modulus at 300% extension, as shown in Table III below:

TABLE I

*Effect of dimethallyl in the isobutylene-isoprene copolymer*

| Run No. | Feed | | Percent Conv. | Catalyst Efficiency | Stand. Mol. Wt. |
|---|---|---|---|---|---|
| | Percent Dimethallyl | Percent Butene-1 | | | |
| 1 | 0 | 8.5 | 72.5 | 270 | |
| 2 | 0 | 8.5 | 50 | 189 | 39,400 |
| 3 | 0.2 | 8.5 | 62 | 182 | 39,800 |
| 4 | 0.3 | 8.5 | 77 | 223 | 35,800 |
| 5 | 0.4 | 11.4 | 59 | 147 | 37,200 |
| 6 | 0.5 | 14.3 | 65 | 148 | 34,200 |
| 7 | 0.7 | 17.0 | 68 | 140 | 33,800 |
| 8 | 1.0 | 17.0 | 70 | 144 | 31,600 |
| 9 | 2.0 | 17.0 | 78 | 161 | 37,000 |
| 10 | 4.0 | 17.0 | 65 | 134 | 1 22,700 |
| 11 | 6.0 | 17.0 | 61.5 | 123 | 1 26,800 |
| 12 | 10.0 | 17.0 | 65 | 108 | (2) |

1 Unreliable values because of polymer insolubility in diisobutylene.
2 Insoluble.

TABLE II

*Effect of dimethallyl in the isobutylene-isoprene copolymer*

| Run No. | Feed | | Mole Percent Unsat. $I_2$—Hg $(OAc)_2$ | Cold Flow at 40° C., Percent/sec. | Recoverable Deformation at 100 secs., Percent | Mooney Viscosity 1½'–8' |
|---|---|---|---|---|---|---|
| | Percent Dimethallyl | Percent Butene-1 | | | | |
| 1 | 0 | 8.5 | 1.38 | 0.067 | 26.2 | 40–38 |
| 2 | 0 | 8.5 | 1.23 | | | 50–47 |
| 3 | 0.2 | 8.5 | 1.34 | | | 53–49 |
| 4 | 0.3 | 8.5 | 1.27 | 0.010 | 34.1 | 40–36 |
| 5 | 0.4 | 11.4 | 1.34 | | | 47–43 |
| 6 | 0.5 | 14.3 | 1.42 | 0.037 | 30.0 | 41–38 |
| 7 | 0.7 | 17.0 | 1.34 | 0.048 | 30.3 | 39–35 |
| 8 | 1.0 | 17.0 | 1.34 | (1) | | 30–28 |
| 9 | 2.0 | 17.0 | 1.78 | (1) | 37.9 | 37–38 |
| 10 | 4.0 | 17.0 | 2.00 | | | 49–51 |
| 11 | 6.0 | 17.0 | 2.76 | | | 42–44 |
| 12 | 10.0 | 17.0 | 2.90 | | | 51–53 |

1 The recovered height was greater than the original height and percent cold flow could not be calculated.

TABLE III

*Effect of dimethallyl in the isobutylene-isoprene copolymer*

| Run No. | Feed | | Extrusion | | | 8' Tube Stock Cure at 320° F. | | | |
|---|---|---|---|---|---|---|---|---|---|
| | Percent Dimethallyl | Percent Butene-1 | Rate, in./min. | Swell, g./in. | Appearance [1] | Tensile | Elongation | Modulus | |
| | | | | | | | | 300% | 400% |
| 1 | 0 | 8.5 | 65.5 | 1.77 | S | 1,780 | 700 | 435 | 700 |
| 2 | 0 | 8.5 | 54 | 1.96 | S | 2,090 | 730 | 600 | 870 |
| 3 | 0.2 | 8.5 | 64 | 1.8 | S | 1,990 | 700 | 490 | 800 |
| 4 | 0.3 | 8.5 | 57.5 | 1.95 | S | 1,810 | 740 | 450 | 670 |
| 5 | 0.4 | 11.4 | 65 | 1.81 | S | 2,020 | 740 | 490 | 770 |
| 6 | 0.5 | 14.3 | 67 | 1.86 | S | 1,790 | 680 | 520 | 840 |
| 7 | 0.7 | 17.0 | 68 | 1.90 | S | 1,850 | 720 | 470 | 790 |
| 8 | 1.0 | 17.0 | 45 | 2.46 | I | 1,650 | 710 | 560 | 800 |
| 9 | 2.0 | 17.0 | 35 | 2.56 | I | 1,810 | 670 | 755 | 1,020 |
| 10 | 4.0 | 17.0 | 30 | 2.38 | R | 1,770 | 610 | 920 | 1,180 |
| 11 | 6.0 | 17.0 | 28 | 2.36 | R | 1,530 | 460 | 1,080 | 1,350 |
| 12 | 10.0 | 17.0 | 32 | 2.17 | R | 1,330 | 250 | | |

[1] S—smooth; I—intermediate; R—rough.

These results show the substantial reduction in cold flow of the polymer which is found to be sufficient to reduce the inspection loss from bruising and similar damage in normal tube factory processing operations. The vulcanizate properties were good.

EXAMPLE 2

Another series of polymerizations were carried out in which substantially the same reaction conditions were employed as in Example 1. The polymerization reaction mixture contained about 5% isoprene based on the amount of isobutylene used. In each run, varying amounts of divinyl benzene and dimethallyl were employed, and the properties of the resulting polymers and vulcanizates were studied and compared. The data obtained in these comparative measurements are shown below in Table IV. The polymers were compounded according to the following recipe, there being employed a relatively high percentage of dioctyl sebacate as plasticizer in order to obtain a plastic rubber product having low temperature flexibility.

| | Parts |
|---|---|
| Polymer | 100 |
| Zinc oxide | 5 |
| Phil black (thermal) | 15 |
| Thermax | 35 |
| Sulfur | 1.5 |
| Tellurac (tellurium diethyl dithio carbamate) | 1.5 |
| Dioctyl sebacate | 25 |

TABLE IV

*Comparative effects of divinylbenzene and dimethallyl as modifying agents*

| Run No. | Modifier | | Mole percent Unsaturation (Iodine No.) | Vulcanizates, 30' at 320° F. | | Elongation | Percent Volume Increase |
|---|---|---|---|---|---|---|---|
| | Percent | Type | | Modulus 200–300% | Tensile | | |
| 14 | | | 2.15 | 350–550 | 1,280 | 590 | 370 |
| 15 | 0.5 | Divinyl-benzene | 2.66 | 400–650 | 1,010 | 440 | 370 |
| 16 | 1.0 | do | Insoluble | 400–760 | 940 | 370 | 380 |
| 17 | 1.5 | do | do | | | | |
| 18 | 0.5 | Dimethallyl | 2.53 | 420–690 | 920 | 430 | 360 |
| 19 | 1.0 | do | 3.09 | 490–800 | 890 | 340 | 355 |
| 20 | 1.5 | do | 2.71 | 410–650 | 950 | 460 | 350 |

The above data of Table IV indicate that in the dimethallyl modified rubber there is a relatively larger percentage of side chain double bonds. This is shown by the higher iodine number values of the dimethallyl modified product over the values for the rubber containing no crosslinking agent. The relatively higher modulus and lower state of swelling for the rubber containing dimethallyl is also indicative of decided advantage in that these values indicate a relatively higher state of cure.

The substance of the invention thus is a long chain, slightly branched, hydrocarbon having a high molecular weight, which is of relatively low unsaturation, which has solid rubbery characteristics, substantially soluble in hydrocarbon solvents generally, such as naphtha, kerosene, lubricating oils, benzene, toluene, mixed alkyl aromatics and in chlorinated hydrocarbons and resistant to acid, alkaline and water solutions generally, which may be cured with sulfur to yield a high tensile strength rubbery material having high resistance to flexure and abrasion. Such soluble rubbers can be employed advantageously in the manufacture of rubber cements as well as in preparing fabric and tape coatings which are conveniently cast as protective films from solution. Rubber solutions can also be employed in making waterproof garments.

While there are above disclosed but a limited number of embodiments of the present invention, it is possible to produce still other embodiments without departing from the inventive concepts herein disclosed, and it is therefore desired that only such limitations be imposed on the appended claims as are stated therein or required by the prior art.

What is claimed is:

1. In a polymerization process for the copolymerization of isobutylene and a conjugated multi-olefin having from 4 to 8 carbon atoms per molecule by the application thereto at a temperature within the range between −40° C. and −164° C. of a Friedel-Crafts catalyst in solution in a low-freezing, non-complex-forming solvent, in the presence of an alkyl halide diluent, the steps in combination of adding to the mixed unsaturate from 0.1% to 0.8% of a non-conjugated diolefin of the structure:

$$H_2C=C-(CH_2)_x-C=CH_2$$
$$\phantom{H_2C=C-}CH_3\phantom{(CH_2)_x-}CH_3$$

wherein $x$ is an integer from 1 to 6, and polymerizing the resulting mixture whereby a co-polymer which is soluble in hydrocarbon solvents and which has a cold flow at 40 degrees C. of less than 0.067% per second is produced.

2. In a polymerization process for the copolymerization of isobutylene with a conjugated diolefin having from 4 to 8 carbon atoms per molecule at a temperature within the range between −40° C. and −164° C. by the application of a Friedel-Crafts catalyst in solution in a low-freezing, non-complex-forming solvent, in the presence of an alkyl halide diluent, the step of adding to the mixed unsaturates from 0.1% to 0.8% of a non-conjugated diolefin of the structure:

$$H_2C=C-(CH_2)_x-C=CH_2$$
$$\phantom{H_2C=C-}CH_3\phantom{(CH_2)_x-}CH_3$$

wherein $x$ is an integer from 1 to 6, and polymerizing the resulting mixture whereby a co-polymer which is soluble in hydrocarbon solvents and which has a cold flow at 40 degrees C. of less than 0.067% per second is produced.

3. In a polymerization process for the copolymerization of isobutylene with a conjugated diolefin having from 4 to 8 carbon atoms, inclusive, per molecule at a temperature within the range between −40° C. and −164° C. by the application of a Friedel-Crafts catalyst in solution in a low-freezing, non-complex-forming solvent, in the presence of an alkyl halide diluent, the step of adding to the mixed unsaturates from 0.1% to 0.8% of dimethallyl and polymerizing the mixture in the presence of the dimethallyl whereby a co-polymer which is soluble in hydrocarbon solvents and which has a cold flow at 40 degrees C. of less than 0.067% per second is produced.

4. In a polymerization process for the copolymerization of isobutylene with isoprene at a temperature within the range between −40° C. and −164° C. by the application of a Friedel-Crafts catalyst in solution in a low-freezing, non-complex-forming solvent, in the presence of methyl chloride as a diluent, the step of adding to the mixed unsaturates from 0.1% to 0.8% of a non-conjugated diolefin of the structure:

$$H_2C=C-(CH_2)_x-C=CH_2$$
$$\phantom{H_2C=C-}CH_3\phantom{(CH_2)_x-}CH_3$$

wherein $x$ is an integer from 1 to 6, and polymerizing the resulting mixture whereby a co-polymer which is soluble in hydrocarbon solvents and which has a cold flow at 40 degrees C. of less than 0.067% per second is produced.

5. In a polymerization process for the copolymerization of isobutylene with isoprene at a temperature within the range between −40° C. and −164° C. by the application of a Friedel-Crafts catalyst in solution in a low-freezing, non-complex-forming solvent, in the presence of methyl chloride as a diluent, the step of adding to the mixed unsaturates from 0.1% to 0.8% of dimethallyl and copolymerizing the mixture in the presence of the dimethallyl whereby a copolymer which is soluble in hydrocarbon solvents and which has a cold flow at 40 degrees C. of less than 0.067% per second is produced.

6. In a polymerization process for the copolymerization of isobutylene with isoprene at a temperature within the range between −40° C. and −164° C. by the application of a catalyst solution consisting of aluminum chloride in a low-freezing, non-complex-forming solvent, the step of adding to the mixed unsaturates from 0.1% to 0.8% of dimethallyl and polymerizing the mixture in the presence of the dimethallyl whereby a co-polymer which is soluble in hydrocarbon solvents and which has a cold flow at 40 degrees C. of less than 0.067% per second is produced.

7. A synthetic, solid, plastic hydrocarbon interpolymer of a major proportion of isobutylene with a minor proportion of a conjugated diolefin having from 4 to 8, inclusive, carbon atoms per molecule and an amount within the range between 0.1% and 0.8% of a non-conjugated diolefin of the structure:

$$H_2C=C-(CH_2)_x-C=CH_2$$
$$\phantom{H_2C=C-}CH_3\phantom{(CH_2)_x-}CH_3$$

wherein $x$ is an integer from 1 to 6, the polymer being characterized by a low unsaturation indicated by an iodine number within the range between 1 and 50, a molecular weight above 25,000, reactivity with sulfur to yield an elastic product, a very low cold flow at 40° C. of 0.067% per second and solubility in hydrocarbon solvents.

8. A synthetic, solid, plastic hydrocarbon interpolymer of a major proportion of isobutylene with a minor proportion of isoprene and an amount within the range between 0.1% and 0.8% of a non-conjugated diolefin of the structure:

$$H_2C=C-(CH_2)_x-C=CH_2$$
$$\phantom{H_2C=C-}CH_3\phantom{(CH_2)_x-}CH_3$$

wherein $x$ is an integer from 1 to 6, the polymer being characterized by a low unsaturation indicated by an iodine number within the range between 1 and 50, a molecular weight above 25,000, reactivity with sulfur to yield an elastic product, a very low cold flow at 40° C. of 0.067% per second and solubility in hydrocarbon solvents.

9. A synthetic, solid, plastic hydrocarbon, oil soluble interpolymer of a major proportion of isobutylene with a minor proportion of a conjugated diolefin having 4 to 8 carbon atoms per molecule and an amount within the range between 0.1% and 0.8% of dimethallyl, the polymer being characterized by a low unsaturation indicated by an iodine number within the range between 1 and 50, a molecular weight above 25,000, reactivity with sulfur to yield an elastic product, a very low cold flow at 40° C. of 0.067% per second and solubility in hydrocarbon solvents.

10. A synthetic, solid, plastic hydrocarbon, oil soluble interpolymer of a major proportion of isobutylene with a minor proportion of isoprene and an amount within the range between 0.1% and 0.8% of dimethallyl, the polymer being characterized by a low unsaturation indicated by an iodine number within the range between 1 and 50, a molecular weight above 25,000, reactivity with sulfur to yield an elastic product, a very low cold flow at 40° C. of 0.067% per second and solubility in hydrocarbon solvents.

11. In a polymerization process for the copolymerization of isobutylene with a conjugated diolefin having from 4 to 8 carbon atoms, inclusive, per molecule at a temperature within the range between −40° C. and −164° C. by the application of a Friedel-Crafts catalyst in solution in a low-freezing, non-complex-forming solvent in a concentration of about 0.23 weight per cent in the presence of methyl chloride as a diluent, the improvement which comprises the steps of adding to the mixed unsaturates 0.1% to 0.8% of dimethallyl and polymerizing the mixture in the presence of the dimethallyl and in the presence of about three volumes of inert diluent based on the volume of mixed unsaturates whereby a co-polymer which is soluble in hydrocarbon solvents and which has a cold flow at 40 degrees C. of less than 0.067% per second is produced.

12. In a polymerization process for the copolymerization of isobutylene with a conjugated diolefin having from 4 to 8 carbon atoms, inclusive, per molecule at a temperature within the range between −40° C. and −164° C. by the application of a polymerization catalyst consisting of aluminum chloride in solution in methyl chloride in a concentration of about 0.23 weight per cent in the presence of methyl chloride as a diluent, the improvement which comprises the steps of adding to the mixed unsaturates from 0.1% to 0.8% of dimethallyl and polymerizing the mixture in the presence of the dimethallyl and in the presence of about three volumes of methyl chloride based on the volume of mixed unsaturates whereby a co-polymer which is soluble in hydrocarbon solvents and which has a cold flow at 40 degrees C. of less than 0.067% per second is produced.

LESTER MARSHALL WELCH.
JOSEPH F. NELSON.
HOWARD L. WILSON.

References Cited in the file of this patent
UNITED STATES PATENTS

| Number | Name | Date |
| --- | --- | --- |
| 2,322,073 | Thomas et al. | June 15, 1943 |